United States Patent [19]
Gott et al.

[11] Patent Number: 5,234,965
[45] Date of Patent: Aug. 10, 1993

[54] PROCESS FOR THE PRODUCTION OF POLYURETHANE FOAMS

[75] Inventors: Samuel L. Gott; Thomas E. Carter; Wade T. Petroskey, all of Kingsport; T. Hugh Williams, Fall Branch; G. C. Zima, Kingsport, all of Tenn.

[73] Assignee: Eastman Kodak Company, Rochester, N.Y.

[21] Appl. No.: 985,714

[22] Filed: Dec. 4, 1992

[51] Int. Cl.$^5$ .............................. B05D 3/02; C08J 9/00
[52] U.S. Cl. .................................... 521/116; 521/129; 521/130; 521/172
[58] Field of Search ................ 521/129, 116, 130, 172

[56] References Cited

U.S. PATENT DOCUMENTS 4,963,399 10/1990 Gill ...................................... 521/129
5,051,529 9/1991 Witzeman ........................... 560/178
5,084,486 1/1992 Patten et al. ......................... 521/129
5,171,759 12/1992 Hager .................................. 521/174
5,177,119 1/1993 Motte .................................. 521/170

*Primary Examiner*—Morton Foelak
*Attorney, Agent, or Firm*—John D. Thallemer; William P. Heath, Jr.

[57] ABSTRACT

The present invention relates to a process for preparing flexible, semi-flexible or rigid polyurethane foam plastics from a polyfunctional isocyanate and a polyhydric compound. More specifically, the invention involves the substitution of some portion of the hydroxy groups on the polyhydric compound with acetoacetate groups. Such substitution reduces the viscosity of the polyhydric resin without effecting the performance properties of the foams. Various substitution levels can be used depending on the desired level of viscosity reduction.

31 Claims, No Drawings

PROCESS FOR THE PRODUCTION OF POLYURETHANE FOAMS

FIELD OF THE INVENTION

The present invention relates to a process for preparing flexible, semi-flexible or rigid polyurethane foam plastics from a polyfunctional isocyanate and a polyhydric compound. More specifically, the invention involves the substitution of some portion of the hydroxy groups on the polyhydric compound with acetoacetate groups. Such substitution reduces the viscosity of the polyhydric resin without effecting the performance properties of the foams. Various substitution levels can be used depending on the desired level of viscosity reduction.

BACKGROUND OF THE INVENTION

The chemical ingredients of a urethane foam system are a polyfunctional isocyanate and a polyhydric compound, along with catalysts necessary to control the rate and type of reaction, blowing agents necessary to control the rate at which gas is released, and surfactants necessary to stabilize the reaction. The reaction product when the polyfunctional isocyanate and the polyhydric compound are brought together is a polyurethane.

Polyurethane foams are produced using volatile liquids, usually chlorofluorocarbons, which act as blowing agents, producing gas on heating the foaming mixture. Besides acting as a blowing agent, the chlorofluorocarbons significantly reduce the overall polyhydric resin viscosity, thus allowing for easier processing. The problem with chlorofluorocarbons, however, is that they deplete the ozone layer of the upper atmosphere. Recently, the Environmental Protection Agency and local Air Quality Management Districts have stepped up their efforts to regulate the amount of chlorofluorocarbons (CFC's). Any reduction of chlorofluorocarbons from urethane foam products will help achieve acceptable environmental conditions, and help prepare the industry for the probability of more stringent air pollution regulations in the future.

The eventual elimination of chlorofluorocarbons, however, presents a serious concern to urethane foam producers since non-chlorofluorocarbon blowing agents such as water and methylene chloride, do not have the dual effect of functioning as blowing agents and reducing the viscosity of polyhydric resins. In contrast, the present inventors have unexpectedly discovered that replacing some portion of the hydroxyl groups on the polyhydric compounds with acetoacetate groups significantly reduces the viscosity of the polyhydric resins without deleteriously effecting the reactivity of the polyhydric resins or the performance properties of urethane foam products made therefrom.

U.S. Pat. No. 5,051,529 discloses the use of the acetoacetate moiety in coatings to impart functionality capable of undergoing a variety of cross-linking reactions while simultaneously lowering the viscosity of the resulting formulation. However, the effect of acetoacetylation on polyurethane foams has never been determined.

SUMMARY OF THE INVENTION

Accordingly, one object of the present invention is to provide a process for preparing flexible, semi-flexible or rigid foam plastics containing urethane groups.

Another object of the invention is to provide a process for producing low viscosity polyhydric resins used in the production of polyurethane foam without the addition of chlorofluorocarbons.

These and other objects are accomplished herein by a process for the production of polyurethane foam comprising reacting an organic polyisocyanate (A) with a polyhydric compound (B) and a blowing agent (E), in the presence of a catalyst containing tertiary nitrogen atoms (F) and optionally in the presence of other foam additives, the improvement comprising replacing 3 to 80 mole percent of the hydroxyl groups on the polyhydric compound (B) with acetoacetate groups from an acetoacetylating agent (C).

The present invention is also directed to a process for preparing polyurethane foam comprising reacting an organic polyisocyanate (A) with a polyhydric compound (B) and a blowing agent (E), in the presence of a catalyst containing tertiary nitrogen atoms (F) and optionally in the presence of other foam additives, the improvement comprising replacing 3 to 80 mole percent of the hydroxyl groups on the polyhydric compound (B) with acetoacetate groups from an acetoacetylating agent (C) in the presence of 10 ppm to 1000 ppm of an acetoacetylating catalyst (D) which contains tertiary nitrogen atoms.

DESCRIPTION OF THE INVENTION

The isocyanate, component (A), suitable for the process according to the present invention includes essentially any organic polyisocyanate such as aliphatic, cycloaliphatic, araliphatic, aromatic and heterocyclic polyisocyanates. Specific examples include ethylene diisocyanate; 1,4-tetramethylene diisocyanate; 1,6-hexamethylene diisocyanate; 1,12-dodecane diisocyanate; cyclobutane 1,3-diisocyanate; cyclohexane-1,3- and 1,4-diisocyanate, and mixtures of these isomers; 1-isocyanato 3,3,5-trimethyl-5-isocyanatomethylcyclohexane; 2,4- and 2,6-hexahydrotoluene diisocyanate, and mixtures of these isomers; hexahydro 1,3- and/or 1,4-phenylene diisocyanate; perhydro-2,4'- and/or -4,4'-diphenylmethane diisocyanate; 1,3- and 1,4-phenylene diisocyanate; 2,4- and 2,6-toluene diisocyanate, and mixtures of these isomers; diphenylmethane 2,4'- and/or -4,4'-diisocyanate; naphthalene 1,5-diisocyanate; triphenylmethane-4,4', 4'-triisocyanate; polyphenylpolymethylene polyisocyanates of the type obtained by condensing aniline with formaldehyde, followed by phosgenation such as LUPRANATE M-20S available from BASF, Wyandotte, Mich.; perchlorinated arylpolyisocyanates; polyisocyanates containing carbodiimide groups, diisocyanates; polyisocyanates containing allophanate groups; polyisocyanates containing isocyanurate; polyisocyanates containing urethane groups; polyisocyanate containing acylated urea groups; polyisocyanates containing biuret groups; and reaction products of the aforementioned isocyanates with acetals.

It is also possible to use the distillation residues containing isocyanate groups accumulating in the commercial production of isocyanates, optionally dissolved in one or more of the aforementioned polyisocyanates. Mixtures of the aforementioned polyisocyanates are also included.

In general, it is particularly preferred to use the readily accessible polyisocyanates such as 2,4- and 2,6-toluene diisocyanate and mixtures of these isomers; polyphenyl polymethylene polyisocyanates, of the type obtained by aniline formaldehyde condensation and subsequent phosgenation; and polyisocyanates containing carbodiimide groups, urethane groups, allophanate groups, isocyanurate groups, urea groups or biuret groups.

The second component, component (B), is a polyhydric compound having a molecular weight of from 200 to 10,000. Particularly, preferred polyhydric compounds are those containing 2 to 8 hydroxyl groups, and especially those with molecular weights of from 250 to 3,000, most preferably 300 to 1,000. Examples include, polyols, polyesters, polyethers, polyalkylene glycols, polythioethers, polyacetals, polycarbonates and polyesteramides containing at least 2 and generally 2 to 8 and preferably 2 to 6 hydroxyl groups. Additional polyhydric compounds include polypropylene glycol, OH terminated poly(ethylene adipate), OH terminated poly(butylene adipate), polycaprolactone, poly(tetramethylene ether glycol), trifunctional polymers obtained by chain extending glycerol or trimethylolpropane with propylene oxide and/or caprolactone units, polyesters made from dibasic acids, diols and triols to provide polymers having more than two hydroxy groups per molecule, or polyacrylates containing hydroxyethyl(meth)acrylate repeating units.

Examples of suitable polyesters containing hydroxyl groups include reaction products of polyhydric, preferably dihydric, and, optionally, trihydric alcohols with polyvalent, preferably divalent carboxylic acids. Instead of the free polycarboxylic acids the corresponding polycarboxylic acid anhydrides or esters with lower alcohols or mixtures thereof may also be used for the production of the polyesters. The polycarboxylic acids may be aliphatic, cycloaliphatic, aromatic and/or heterocyclic, and may optionally be substituted, for example, by halogen atoms, and/or they may be unsaturated. Examples of these polycarboxylic acids are succinic acid, adipic acid, terephthalic acid, isophthalic acid, trimellitic anhydride, phthalic anhydride, maleic acid, maleic acid anhydride and fumaric acid. Examples of suitable polyhydric alcohols include ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bishydroxymethylcyclohexane), 2-methyl-1,3-propane diol, glycerol, trimethylol-propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, polybutylene glycols and glycol esters of polycarboxylic acids such as terephthalic acid bis-glycol ester. The polyesters may contain terminal carboxyl groups. Polyesters of lactones, for example, $\epsilon$-caprolactone, or hydroxycarboxylic acids, for example, $\omega$-hydroxycaproic acid, may also be used.

The polyethers containing at least two and usually two to eight, and preferably three to six hydroxyl groups suitable for use in accordance with the invention, include those obtained by the polymerization of epoxides, such as ethylene oxide, propylene oxide, butylene oxide, tetrahydrofuran, styrene oxide or epichlorohydrin, for example, in the presence of $BF_3$, or by the chemical addition of these epoxides to starting components with reactive hydrogen atoms, such as water, ethylene glycol, 1,3- or 1,2-propylene glycol, trimethylolpropane, 4,4'-dihydroxydiphenylpropane, aniline, ammonia, ethanolamine and ethylene diamine.

Sucrose polyethers are also suitable for the purposes of the invention. Polyethers modified by vinyl monomers of the type obtained, for example, by the polymerization of styrene and acrylonitrile in the presence of polyethers are also suitable, as are polybutadienes containing at least two hydroxy groups.

Among the polythio-ethers usable are included the condensation products of thiodiglycol with itself and/or with other glycols, dicarboxylic acids, formaldehyde, aminocarboxylic acids or aminoalcohols. Depending on the co-omponents, these products are polythio-mixed ethers, polythio-ether esters or polythio-ether ester amides. Suitable polyacetals include those compounds which may be obtained from glycols, such as diethylene glycol, triethylene glycol, 4,4'-dioxethoxy diphenyldimethyl methane and hexane diol, and formaldehyde. Polyacetals suitable for the purposes of the invention may also be obtained by polymerizing cyclic acetals.

Suitable polycarbonates containing hydroxyl groups include those obtainable by reacting diols, such as 1,3-propane diol, 1,4-butane diol and/or 1,6-hexane diol, diethylene glycol, triethylene glycol and tetraethylene glycol, with diarylcarbonates, such as diphenylcarbonate or phosgene.

Examples of polyester amides and polyamides include the predominantly linear condensates obtained from polyvalent saturated and unsaturated carboxylic acids or their anhydrides and polyhydric saturated and unsaturated amino alcohols, diamines, polyamines and mixtures thereof.

Polyhydric compounds already containing urethane or urea groups and modified natural polyols, such as castor oil, carbohydrates and starch, may also be used. The addition products of alkylene oxides with phenolformaldehyde resins or even with urea-formaldehyde resins may also be used in accordance with the invention.

Suitable polyhydric compounds which are commercially available from Eastman Chemical Company include the THANOL series of polyols. For example, the THANOL polyols include F-1500, hydroxyl no. 106-118, F-3000, hydroxyl no. 54.5-57.5, F-3020, hydroxyl no. 54.5-57.5, F-3048, hydroxyl no. 54.5-57.5, F-3520, hydroxyl no. 46.5-49.5, F-3548, hydroxyl no. 46-50, F-3550, hydroxyl no. 46-50, R-350-X, hydroxyl no. 520-540, R-420, hydroxyl no. 520-540, R-470-X, hydroxyl no. 460-480, R-572, hydroxyl no. 520-545, R-575, hydroxyl no. 510-530, R-650-X, hydroxyl no. 440-460, R-3421, hydroxyl no. 460-500, SF-265, hydroxyl no. 625-645, E-2103, hydroxyl no. 54-58, PPG-400, hydroxyl no. 240-265, PPG-1000, hydroxyl no. 110-114, PPG-2000, hydroxyl no. 55-57, SF-700, hydroxyl no. 232-248, SF-1343, hydroxyl no. 34-36, SF-1345, hydroxyl no. 33-35, SF-1373, hydroxyl no. 26-28, SF-1502, hydroxyl no. 106-118, SF-1505, hydroxyl no. 106-118, SF-5505, hydroxyl no. 32-35, SF-5507, hydroxyl no. 32-35, SF-6509, hydroxyl no. 27-29.

The third component of the invention, component (C), is an acetoacetylating agent. Suitable acetoacetylating agents include ketene dimers and ketene dimer adducts which react with polyhydric compounds to form acetoacetate derivatives of the polyhydric compound. Suitable ketene dimers include aliphatic ketene dimers such as diketene, methyl ketene dimer, hexyl ketene dimer, propenyl ketene dimer, phenyl ketene dimer and phenyl ethyl ketene dimer. Diketene is preferred. Reactive ketene dimer adducts include the reaction product of acetone with diketene such as 2,2,6-trimethyl-4H-1,3-dioxin-4-one (TKD). Reactive ketene dimers adducts also include the reaction product of alcohols with diketene, referred to as acetoacetate esters. Suitable acetoacetate esters include methyl acetoacetate, ethyl acetoacetate, isopropyl acetoacetate, butyl acetoacetate, t-butyl acetoacetate, methyl benzyl acetoacetate, dodecyl acetoacetate and similar aliphatic acetoacetates. Preferably the acetoacetate ester is t-butyl acetoacetate.

The use of such acetoacetylating agents significantly reduces the viscosity of the polyhydric compound thus allowing polyurethane foam producers to formulate lower CFC foams while maintaining excellent foam properties. Table I sets forth the reduction in viscosity of 15 mole percent acetoacetate substitution as compared to no substitution for selected polyhydric compounds.

TABLE I

| THANOL Polyol | Viscosity (cps) at 23.5° C. | | |
|---|---|---|---|
| | No Sub. | 15% Sub. | Reduction |
| R-575 | 29,500 | 12,000 | 59% |
| R-650-X | 21,500 | 10,500 | 51% |
| R-350-X | 13,000 | 5,500 | 58% |
| R-470-X | 10,000 | 4,500 | 55% |
| R-3421 | 3,500 | 2,000 | 43% |

The results in Table I clearly indicate that a 15 mole percent acetoacetate substitution results in a 40 to 60 percent reduction in the viscosity of the polyhydric compound.

Table II sets forth the effect on viscosity of 75 mole percent acetoacetate substitution using Thanol R-650-X polyol as compared to no substitution for Thanol R-650-X polyol.

TABLE II

| THANOL Polyol | Viscosity (cps) at 23.5° C. | | | |
|---|---|---|---|---|
| | No Sub. | 25% Sub. | 50% Sub. | 75% Sub. |
| R-650-X | 21,500 | 6,820 | 2,740 | 1,484 |

The results in Table II indicate that the Viscosity of the polyhydric compound is directly proportional to the amount of acetoacetylation up to at least 75 mole percent substitution.

In addition, aging of the polyhydric compounds does not effect the viscosity of such polyhydric compounds. Table III sets forth the effect of 30 day aging at 60° C. on the viscosity for THANOL polyols R-575 and R-650-X as compared to the initial or non aged viscosities of such polyols.

TABLE III

| | THANOL Polyol | Viscosity (cps) at 23.5° C. | | | |
|---|---|---|---|---|---|
| | | No Sub. | 5% Sub. | 10% Sub. | 15% Sub. |
| Init. | R-575 | 30,000 | 22,500 | 15,000 | 12,000 |
| Aged | R-575 | 30,000 | 21,500 | 14,800 | 12,000 |
| Init. | R-650-X | 22,000 | 19,000 | 14,800 | 10,600 |
| Aged | R-650-X | 22,000 | 18,000 | 14,000 | 10,600 |

The results in Table III clearly indicate that aging of the polyols does not effect the viscosity of such polyols at similar levels of substitution.

For purposes of the present invention, at least three mole percent of the polyhydric compounds need to be acetoacetylated to achieve noticeable viscosity reductions. Less than three mole percent has no noticeable effect on the viscosity of the polyhydric compounds. It is within the scope of the invention to have up to 80 mole percent of the hydroxyl groups on the polyhydric compounds replaced with acetoacetate groups. The present inventors have determined, as set forth in Table 1, that a 15 mole percent acetoacetate substitution results in a 40 to 60 percent reduction in the viscosity of the polyhydric compound. Thus, it is preferred that 5 to 25 mole percent of the polyhydric compounds are acetoacetylated and more preferably, 12 to 18 mole percent.

The amount of acetoacetylating agent is determined by dividing the weight of the polyhydric compound by the equivalent weight of the polyhydric compound, multiplying by the equivalent weight of the acetoacetylating agent, and then multiplying by the percent substitution required. For example, to calculate the amount of t-butyl acetoacetate to use for a 20 mole percent substitution of acetoacetate groups for hydroxyl groups using 1000 grams of THANOL R-650-X polyol, wherein the equivalent weight of the polyol is 124.7 and the equivalent weight of the acetoacetylating agent is 158, the following equation would be used: $1000/124.7 \times 158 \times 0.20$ which equals 253.4. Thus, 253.4 grams of t-butyl acetoacetate would be required to achieve a 20 mole percent substitution of acetoacetate groups for hydroxyl groups. The following equation is used to calculate the amount of diketene to use for a 5 mole percent substitution of acetoacetate groups for hydroxyl groups using THANOL R-650-X polyol, wherein the equivalent weight of the diketene is 84.1: $0.05 \times 84.1 = 4.2$ grams of diketene/124.7 grams polyhydric compound.

In the process of the present invention, the acetoacetylating agent is added to the polyhydric compound which optionally contains an acetoacetylating catalyst, component (D). Component (D) includes any catalyst containing tertiary nitrogen atoms as long as it speeds up the reaction between the acetoacetylating agent and the hydroxy groups on the polyhydric compound. Such catalysts include tributylamine, triethylamine, triethanolamine, N-methylmorpholine, N,N-dimethylbenzylamine, N-ethylmorpholine, N,N-dimethylaminopyridine, triamylamine and the like. The acetoacetylating catalyst (D) may be identical to the catalyst used in the foaming and crosslinking reaction. The acetoacetylating catalyst is used in the range from about 10 ppm to about 1000 ppm, preferably, 50 ppm to 300 ppm. The present inventors have determined that when diketene is employed as the acetoacetylating agent then an acetoacetylating catalyst is necessary, however, when t-butyl acetoacetate is employed, no acetoacetylating catalyst is needed. The polyol and catalyst mixture are heated to a set temperature of about 50° C. to about 160° C. The acetoacetylating agent is added slowly to the mixture while the temperature of the mixture is maintained within 10° C. of the set temperature. In some cases, such as when t-butyl acetoacetate is used, a distillation step is necessary to remove a by-product such as t-butanol. In other cases, such as when the acetoacetylating agent is diketene, no by-product is formed and thus no distillation step is required.

According to the invention, water and/or organic substances are often used as blowing agents, component (E), in the production of the polyurethane foams. Suitable organic blowing agents include halogen-substituted alkanes, such as methylene chloride, chloroform, ethylidene chloride, vinylidene chloride, monofluorodichlormethane, chlorodifluoromethane, dichlorodifluoromethane, butane, hexane, heptane, and diethylether. A blowing effect may also be obtained by adding compounds which decompose spontaneously at temperatures above room temperature which release a gas such as nitrogen. Examples of such compounds include azo compounds, such as azoisobutyronitrile.

Specific examples of blowing agents for use in the invention include CFC-11 and HCFC-141b available from Atochem. While HCFC-141b is a hydrogenated chlorofluorocarbon which breaks down at a lower atmosphere than the standard chlorofluorocarbons, it is nevertheless an ozone depleter. It is important to note, however, that the process of this invention allows one to substitute environmentally unsafe chlorofluorocarbon blowing agents for non-volatile organic blowing agents while maintaining the processability and performance properties of the polyhydric resin.

Catalysts, component (F), that are suitable for foaming and crosslinking reaction include organic bases such as tributylamine, triethylamine, triethanolamine, N-methylmorpholine, N,N-dimethylbenzylamine, N-ethylmorpholine, N,N-dimethylaminopyridine, triamylamine and organotin compounds such as tin-(II)-salts of carboxylic acids, such as tin-(II)-acetate, tin-(II)-octoate, tin-(II)-ethylhexoate and tin-(II)-laurate, and the dialkyl tin salts of carboxylic acids, such as dibutyl tin diacetate, dibutyl tin dilaurate, dibutyl tin maleate or dioctyl tin diacetate. Commercially available tertiary amine catalysts include POLYCAT 8 and DABCO 33LV (diazobicyclo<2,2,2>octane) which are available from Air Products, Allentown, Pa.

The catalysts for foaming and crosslinking are generally present in quantities of from about 0.001 to 10% by weight, based on the quantity of the organic compounds containing at least two hydrogen atoms capable of reaction with isocyanates and having molecular weights of from 400 to 10,000. Catalysts concentrations between 0.1 and 3.0 weight percent, based on the weight of the total formulation, are recommended. Mixtures of the above catalysts can be used to formulate the urethane foam. The catalysts used in accordance with the invention are distinguished by the surprisingly intense accelerating effect which they have upon the foaming reaction, and by the fact that foams produced using them are odorless and show favorable hydrolysis behavior.

According to the invention, surface active additives, emulsifiers and foam stabilizers, may also be used. Examples of emulsifiers include the sodium salts of castor oil sulphonates or of fatty acids or salts of fatty acids with amines, such as diethylamine/oleic acid or diethanolamine/stearic acid. Alkali or ammonium salts of sulphonic acids, such as those of dodecylbenzene sulphonic acid or dinaphthylmethane disulphonic acid, or even or fatty acids, such as ricinoleic acid, or of polymeric fatty acids, may also be used as surface-active additives. In addition, silicon surfactants such as L-5421 available from Union Carbide, Danbury, Conn., may also be used.

Suitable foam stabilizers include water-soluble polyether siloxanes. These compounds are generally of such structure that a copolymer of ethylene oxide and propylene oxide is attached to a polydimethylsiloxane radical.

According to the invention, it is also possible to use reaction retarders such as hydrochloric acid or organic acid halides; cell regulators such as paraffins or fatty alcohols or dimethyl polysiloxanes; pigments or dyes; flameproofing agents such as trisochlor-ethylphosphate or ammonium phosphate and polyphosphate, for example FYROL PCF available from Akzo Chemical Co. Chicago, Ill; stabilizers against the effects of ageing and weather; plasticizers; substances with fungistatic and bacteriostatic effects; and fillers such as barium sulphate, kieselguhr, carbon black or prepared chalk. A polyester/polyol such as TERATE 203, available from Cape Industries, Wilmington, N.C., may also be used to enhance the flameproofing properties of the product.

The general method of producing a cellular polyurethane is to mix the above ingredients and adjust the conditions and reactants such that the exotherm of the reaction causes an expansion of the blowing agent and resultant foaming of the resins. The change of physical properties of the mixture is timed to coincide with the expansion of the foaming mixture such that dimensional stabilization is obtained through crosslinking of the polymer at the time corresponding to the desired density.

Two general types of processes have been developed for producing cellular polyurethane on a commercial scale. The two processes are commonly called the "one-shot" process and the "prepolymer" processes. In the one-shot process all the necessary ingredients for producing the foam are mixed together and then discharged from the mixer onto a suitable surface. The reactions begin immediately and proceed at such a rate that expansion starts in about 10 seconds; and the entire expansion is completed in 1 or 2 minutes. The completion of the curing may take several days.

In the prepolymer process the polyhydric compound is reacted with enough polyisocyanate to result in the formation of a prepolymer with isocyanate end groups plus excess isocyanate. The prepolymer mixture is then reacted with water to simultaneously release carbon dioxide for expansion and link the chains together into a crosslinked matrix. This method is particularly useful for producing flexible foams.

In a "semiprepolymer process" a prepolymer containing excess isocyanate is mixed with more polyhydric resin and a separate blowing agent such as a halocarbon. In this case the prepolymer may contain only a few percent of the total polyhydric resin. This method is particularly useful for producing rigid foams.

After mixing, the resin can be dispensed by several different methods. Typical methods are (1) as an expandable liquid, (2) as a spray of small droplets of mixed resins which adhere to surfaces and foam on these surfaces, and as (3) a froth in which some gas has been mixed with the composition prior to exit from the mixing head, causing the liquid mixture to froth as its pressure is decreased upon exit into atmospheric pressure. A modification of the third method allows the froth to be sprayed in chunks upon a surface with subsequent additional expansion during curing.

The end-products of the process according to the invention are flexible, semi-flexible or rigid foam plastics containing urethane groups. The American Society for Testing and Materials (ASTM) has defined a rigid plastic as a plastic that has a stiffness or apparent modulus of elasticity, E, greater than 7,000 kg/cm$^2$ (100,000 psi) at 23° C. A semirigid plastic has a value of E between 10,000 and 1000,000 psi, and a nonrigid plastic has a value of E of less than 10,000 psi. They are used for the applications normally reserved for products of this type. Typically, such foams are used in mattresses, as upholstery material in furniture and automobiles, as protective padding in automobiles, as sound insulating material, and as heat-insulating and cold insulating material, for example, in the building industry or in the refrigeration industry.

The materials and testing procedures used herein are as follows:
Core Density: ASTM-D1622
Thermal Conductivity: ASTM-C518
Compressive Strength: ASTM-D1621
Dimensional Stability: ASTM-D2126

"Cream" time is the time in seconds after the isocyanate component has been stirred in until the mixture begins to foam.

"String gel" time is the time in seconds after the isocyanate component has been stirred in until a string is generated by contact.

"Tack free" time is the time in seconds after the isocyanate component has been stirred in until the surface of the foam is no longer tacky.

The invention will be further illustrated by a consideration of the following examples, which are intended to be exemplary of the invention. All parts and percentages in the examples are on a weight basis unless otherwise stated.

EXAMPLE I

A rigid polyurethane foam was prepared using the following formulation:

|  | WT % |
|---|---|
| POLYOL RESIN | |
| 1. THANOL R-575 | 48.8 |
| 2. TERATE 203 | 20.7 |
| 3. FYROL PCF | 10.0 |
| 4. L-5421 | 1.0 |
| 5. POLYCAT 8 | 0.6 |
| 6. Deionized water | 0.9 |
| 7. HCFC-141b | 18.0 |
| DIISOCYANATE COMPONENT | |
| 8. LUPRANATE M-20S | 100.0 |

Components 1 to 7 above were mixed using a roller mixer at a temperature of about 25° C. until homogeneous to form a polyol resin. Component 8, the diisocyanate was added to the polyol resin and the resulting mixture was agitated. The mixture was poured into a box and allowed to rise during which time an exothermic reaction occurred. After allowing the samples to cure for 72 hours, the physical properties as indicated in Table IV were determined.

EXAMPLE II

Acetoacetylated rigid polyurethane foams were prepared using the formulation set forth in Example I except that 5, 10 and 15 mole percent of the hydroxy groups of the THANOL R-575 polyol were substituted with acetoacetate groups. Diketene was used as the acetoacetylating agent.

The process for acetoacetylating the THANOL R-575 polyol in 5, 10 and 15 mole percent substitution involved adding 50 ppm of diazobicyclo<2,2,2>octane catalyst to the polyol. The polyol and catalyst mixture were heated to 70° C. Diketene was added dropwise while the temperature was maintained at approximately 70° C. The reaction was continued until the odor of diketene was no longer evident which was approximately 45 minutes in the case of 15 mole percent substitution.

The polyol resin components were mixed using a roller mixer at a temperature of about 25° C. until homogeneous to form a polyol resin. The diisocyanate was added to the polyol resin and the resulting mixture was agitated. The mixture was poured into a box and allowed to rise during which time an exothermic reaction occurred. After allowing the samples to cure for 72 hours, the physical properties as indicated in Table IV were determined.

TABLE IV

| Effect of Acetoacetylation on Foam Reactivity | | | | |
|---|---|---|---|---|
|  | Ex. I No Sub. | Ex. I 5% Sub. | Ex. II 10% Sub. | Ex. II 15% Sub. |
| REACTIVITY PROPERTIES | | | | |
| CREAM TIME (sec) | 33 | 32 | 34 | 30 |
| STRING GEL (sec) | 119 | 131 | 122 | 119 |
| TACK FREE (sec) | 209 | 243 | 230 | 244 |
| VISCOSITIES Polyol Resin (cps) | 688 | 560 | 476 | 422 |
| PHYSICAL PROPERTIES CORE DENSITY (lbs/cu. ft.) | 1.70 | 1.74 | 1.77 | 1.86 |
| THERMAL CONDUCTIVITY ("K" Factor) (BTU in/hr. sq. ft. °F.) | .174 | .176 | .165 | .164 |
| COMPRESSIVE STRENGTH (psi) | | | | |
| Parallel | 27 | 25 | 30 | 28 |
| Perpendicular | 12 | 10 | 12 | 10 |
| DIMENSIONAL STABILITY | | | | |
| Volume change (%) (−20° F. for 7 days) | 0 | 0 | 0 | 0 |
| Volume change (%) (200° F./AMB. RH 14 days) | 6 | 6 | 5 | 3 |
| Volume change (%) (158° F./100% RH 14 days) | 15 | 13 | 13 | 17 |

The data in Table IV clearly indicates that different degrees of acetoacetylation while significantly decreasing the viscosity of the polyhydric resin do not deleteriously effect the reactivity or physical properties of polyurethane foams prepared from such resins. In fact, increased levels of acetoacetylation actually improved the "K" factor which is an indicator of the thermoconductivity of the foam. A slight decrease in the reactivity of the polyurethane foams incorporating acetoacetylation substitution is noted, however, such decrease is insignificant and did not effect the performance properties of the foams.

EXAMPLE III

A rigid polyurethane foam was prepared using the following formulation:

|  | WT % |
|---|---|
| POLYOL RESIN | |
| 1. THANOL R-650-X | 50.0 |
| 2. TERATE 203 | 18.0 |
| 3. FYROL PCF | 8.0 |
| 4. L-5421 | 1.0 |
| 5. POLYCAT 8 | 0.5 |
| 6. Deionized water | 0.5 |
| 7. CFC-11 | 22.5 |
| DIISOCYANATE COMPONENT | |
| 8. LUPRANATE M-20S | 85.2 |

Components 1 to 7 above were mixed using a roller mixer at a temperature of about 25° C. until homogeneous to form a polyol resin. Component 8, the diisocyanate was added to the polyol resin and the resulting mixture was agitated. The mixture was poured into a box and allowed to rise during which time an exothermic reaction occurred. The samples were allowed to cure for 72 hours. The reactivity properties for the polyurethane foam prepared using the above mentioned polyol is summarized in Table V. Table V also contains reactivity data for the polyurethane foam prepared using the above mentioned polyol resin that had been aged at 25° C. for 90 days.

EXAMPLE IV

An acetoacetylated rigid polyurethane foam was prepared using the formulation set forth in Example III except that 5 mole percent of the hydroxy groups of the THANOL R-650-X polyol were substituted with acetoacetate groups. Diketene was used as the acetoacetylating agent.

The process for acetoacetylating the THANOL R-650-X polyol in 5 mole percent substitution involved adding 50 ppm of diazobicyclo<2,2,2>octane catalyst to the polyol. The polyol and catalyst mixture were heated to 70° C. Diketene was added dropwise while the temperature was maintained at approximately 70° C. The reaction was continued until the odor of diketene was no longer evident. Polyurethane foam was prepared using the procedure set forth in Example III. The reactivity properties for the polyurethane foam prepared using the above mentioned polyol is summarized in Table V. Table V also contains reactivity data for the polyurethane foam prepared using the above mentioned polyol resin that had been aged at 25° C. for 90 days.

TABLE V

Reactivity Properties for Foams wherein the Polyol Resin was Aged at 25° C. for 90 Days

|  | Ex. III (No Sub.) | | Ex. IV (No Sub.) | |
| --- | --- | --- | --- | --- |
|  | Init. | Aged | Init. | Aged |
| CREAM TIME (sec) | 13 | 11 | 11 | 11 |
| STRING GEL (sec) | 35 | 36 | 34 | 37 |
| TACK FREE (sec) | 50 | 45 | 48 | 48 |

The results in Table V indicate that the reactivity of polyurethane foam resins is not effected by aging the resins a 25° C. for 90 days.

EXAMPLE V

A standard rigid polyurethane foam was prepared using the following formulation:

|  | WT % |
| --- | --- |
| POLYOL RESIN | |
| 1. THANOL R-650-X | 63.5 |
| 2. L-5421 | 1.0 |
| 3. POLYCAT 8 | 0.5 |
| 4. CFC-11 | 25.0 |
| DIISOCYANATE COMPONENT | |
| 5. LUPRANATE M-20S | 72.4 |

Components 1 to 4 above were mixed using a roller mixer at a temperature of about 25° C. until homogeneous to form a polyol resin. Component 5, the diisocyanate was added to the polyol resin and the resulting mixture was agitated. The mixture was poured into a box and allowed to rise during which time an exothermic reaction occurred. The samples were allowed to cure for 72 hours. The reactivity properties for the polyurethane foam prepared using the above mentioned polyol is summarized in Table VI. Table VI also contains reactivity data for the polyurethane foam prepared using the above mentioned polyol that had been aged at 60° C. for 30 days.

EXAMPLE VI

An acetoacetylated rigid polyurethane foam was prepared using the formulation set forth in Example V except that 5 mole percent of the hydroxy groups of the THANOL R-650-X polyol were substituted with acetoacetate groups. Diketene was used as the acetoacetylating agent.

The process for acetoacetylating the THANOL R-650-X polyol in 5 mole percent substitution involved adding 50 ppm of diazobicyclo<2,2,2>octane catalyst to the polyol. The polyol and catalyst mixture were heated to 70° C. Diketene was added dropwise while the temperature was maintained at approximately 70° C. The reaction was continued until the odor of diketene was no longer evident. Polyurethane foam was prepared using the procedure set forth in Example III. The reactivity properties for the polyurethane foam prepared using the above mentioned polyol is summarized in Table VI. Table VI also contains reactivity data for the polyurethane foam prepared using the above mentioned polyol that had been aged at 60° C. for 30 days.

TABLE VI

Reactivity Properties for Foams wherein the Polyol was Aged at 60° C. for 30 Days

|  | Ex. V (No Sub.) | | Ex. VI (No Sub.) | |
| --- | --- | --- | --- | --- |
|  | Init. | Aged | Init. | Aged |
| CREAM TIME (sec) | 14 | 14 | 15 | 13 |
| STRING GEL (sec) | 41 | 42 | 46 | 46 |
| TACK-FREE (sec) | 57 | 53 | 65 | 59 |

The results in Table VI indicate that the reactivity of polyurethane foam resins is not effected by aging the polyhydric compounds used to make such resins at 25° C. for 90 days.

Many variations will suggest themselves to those skilled in this art in light of the above detailed description. All such obvious modifications are within the full intended scope of the appended claims.

What is claimed is:

1. In a process for the production of polyurethane foam comprising reacting an organic polyisocyanate (A) with a polyhydric compound (B) and a blowing agent (E), in the presence of a catalyst containing tertiary nitrogen atoms (F) and optionally in the presence of other foam additives, the improvement comprising replacing 3 to 80 mole percent of the hydroxyl groups on the polyhydric compound (B) with acetoacetate groups from an acetoacetylating agent (C).

2. In a process for the production of polyurethane foam comprising reacting an organic polyisocyanate (A) with a polyhydric compound (B) and a blowing agent (E), in the presence of a catalyst containing tertiary nitrogen atoms (F) and optionally in the presence of other foam additives, the improvement comprising replacing 3 to 80 mole percent of the hydroxyl groups on the polyhydric compound (B) with acetoacetate groups from an acetoacetylating agent (C) in the presence of 10 ppm to 1000 ppm of an acetoacetylating catalyst (D) which contains tertiary nitrogen atoms.

3. The process of claim 1 wherein 5 to 25 mole percent of the active hydrogen atoms on the polyhydric compound (B) are replaced with acetoacetate groups.

4. The process of claim 3 wherein 12 to 18 mole percent of the active hydrogen atoms on the polyhydric compound (B) are replaced with acetoacetate groups.

5. The process of claim 2 wherein 5 to 25 mole, percent of the active hydrogen atoms on the polyhydric compound (B) are replaced with acetoacetate groups.

6. The process of claim 5 wherein 12 to 18 mole percent of the active hydrogen atoms on the polyhydric compound (B) are replaced with acetoacetate groups.

7. The process of claim 1 wherein the acetoacetylating agent (C) is selected from the group consisting of ketene dimers and ketene dimer adducts.

8. The process of claim 7 wherein the ketene dimer is selected from the group consisting of diketene, methyl ketene dimer, hexyl ketene dimer, propenyl ketene dimer, phenyl ketene dimer and phenyl ethyl ketene dimer.

9. The process of claim 8 wherein the ketene dimer is diketene.

10. The process of claim 7 wherein the ketene dimer adduct is the reaction product of acetone with diketene.

11. The process of claim 10 wherein the reaction product is 2,2,6-trimethyl-4H-1,3-dioxin-4-one.

12. The process of claim 7 wherein the ketene dimer adduct is the reaction product of an alcohol with diketene.

13. The process of claim 12 wherein the reaction product is an acetoacetate ester.

14. The process of claim 13 wherein the acetoacetate ester is selected from the group consisting of methyl acetoacetate, ethyl acetoacetate, isopropyl acetoacetate, butyl acetoacetate, t-butyl acetoacetate, methyl benzyl acetoacetate and dodecyl acetoacetate.

15. The process of claim 14 wherein the acetoacetate ester is t-butyl acetoacetate.

16. The process of claim 2 wherein the acetoacetylating agent (C) is selected from the group consisting of ketene dimers and ketene dimer adducts.

17. The process of claim 16 wherein the ketene dimer is selected from the group consisting of diketene, methyl ketene dimer, hexyl ketene dimer, propenyl ketene dimer, phenyl ketene dimer and phenyl ethyl ketene dimer.

18. The process of claim 17 wherein the ketene dimer is diketene.

19. The process of claim 16 wherein the ketene dimer adduct is the reaction product of acetone with diketene.

20. The process of claim 19 wherein the reaction product is 2,2,6-trimethyl-4H-1,3-dioxin-4-one.

21. The process of claim 16 wherein the ketene dimer adduct is the reaction product of an alcohol with diketene.

22. The process of claim 21 wherein the reaction product is an acetoacetate ester.

23. The process of claim 22 wherein the acetoacetate ester is selected from the group consisting of methyl acetoacetate, ethyl acetoacetate, isopropyl acetoacetate, butyl acetoacetate, t-butyl acetoacetate, methyl benzyl acetoacetate and dodecyl acetoacetate.

24. The process of claim 23 wherein the acetoacetate ester is t-butyl acetoacetate.

25. The process of claim 2 wherein the acetoacetylating catalyst is present in an amount from 50 ppm to 300 ppm.

26. The process of claim 2 wherein the acetoacetylating catalyst is selected from the group consisting of tributylamine, triethylamine, triethanolamine, N-methylmorpholine, N,N-dimethylbenzylamine, N,N-dimethylaminopyridine, N-ethylmorpholine, triamylamine and diazobicyclo<2,2,2>octane.

27. The process of claim 26 wherein the acetoacetylating catalyst is diazobicyclo<2,2,2>octane.

28. The process of claim 2 wherein the acetoacetylating catalyst, component (D), and the catalyst, component (F), are essentially the same chemical compound.

29. The process of claim 28 wherein the acetoacetylating catalyst, component (D), and the catalyst, component (F), are diazobicyclo<2,2,2>octane.

30. A polyurethane foam prepared by the process of claim 1.

31. A polyurethane foam prepared by the process of claim 2.

* * * * *